United States Patent
Kwon et al.

(10) Patent No.: US 7,749,418 B2
(45) Date of Patent: Jul. 6, 2010

(54) METHOD FOR CONTINUOUSLY PRODUCING ARTIFICIAL MARBLE AND APPARATUS THEREFOR

(75) Inventors: Bong-Hyun Kwon, Cheongju-si (KR); Hang-Young Kim, Daejeon (KR); Dong-Jin Bae, Daegu (KR); Kang-Yup Lee, Cheongju-si (KR)

(73) Assignee: LG Chem, Ltd. (KR)

( * ) Notice: Subject to any disclaimer, the term of this patent is extended or adjusted under 35 U.S.C. 154(b) by 234 days.

(21) Appl. No.: 11/564,361

(22) Filed: Nov. 29, 2006

(65) Prior Publication Data

US 2007/0090559 A1    Apr. 26, 2007

Related U.S. Application Data

(62) Division of application No. 10/618,164, filed on Jul. 11, 2003, now Pat. No. 7,160,093.

(30) Foreign Application Priority Data

Dec. 24, 2002    (KR) .................. 10-2002-0083169

(51) Int. Cl.
*B29C 39/16*    (2006.01)
(52) U.S. Cl. ...................... 264/212; 264/216
(58) Field of Classification Search .............. 264/212, 264/216
See application file for complete search history.

(56) References Cited

U.S. PATENT DOCUMENTS 3,376,371 A * 4/1968 Bottoms et al. ............. 264/216
3,422,178 A * 1/1969 Junker et al. ................ 264/216
3,604,053 A * 9/1971 Zemlin et al. ................ 425/89

(Continued)

FOREIGN PATENT DOCUMENTS

JP    10-217264    8/1998

(Continued)

OTHER PUBLICATIONS

JP 200317957 (English machine translation).*

(Continued)

*Primary Examiner*—Joseph S Del Sole
*Assistant Examiner*—Kimberly A Stewart
(74) *Attorney, Agent, or Firm*—Cantor Colburn LLP

(57) ABSTRACT

Disclosed are a method and an apparatus for continuously producing an artificial marble plate capable of simultaneously and uniformly hardening a raw material compound for an artificial marble plate, preventing the warpage of the artificial marble plate, and improving heat transmission efficiency and productivity. The apparatus includes upper and lower carrier films facing each other and receiving a raw material compound for the artificial marble plate into a gap therebetween; upper and lower horizontal heating plates, each including temperature controlling means and heating means for heating upper and lower surfaces of the raw material compound at the same temperature by the same heat transmission manner to harden the raw material compound, while the upper and lower carrier films moving along a gap between the upper and lower horizontal heating plates; and a pair of gaskets disposed at horizontal edges of the upper and lower carrier films for regulating thickness and width of the artificial marble plate obtained by hardening the raw material compound.

5 Claims, 4 Drawing Sheets

U.S. PATENT DOCUMENTS

| | | | | |
|---|---|---|---|---|
| 4,133,861 | A * | 1/1979 | Kato | 264/261 |
| 5,330,595 | A * | 7/1994 | Held | 156/64 |
| 5,372,493 | A * | 12/1994 | Rodgers | 425/188 |
| 5,658,508 | A * | 8/1997 | Yukawa et al. | 264/40.4 |
| 5,979,307 | A * | 11/1999 | Brauer et al. | 100/308 |
| 6,127,458 | A * | 10/2000 | Sakai | 523/220 |
| 2002/0140121 | A1 * | 10/2002 | von Haas | 264/40.1 |
| 2003/0102591 | A1 * | 6/2003 | Thielman et al. | 264/166 |

FOREIGN PATENT DOCUMENTS

JP   2000-317957   11/2000

OTHER PUBLICATIONS

JP 10217264 (English machine translation).*

* cited by examiner

METHOD FOR CONTINUOUSLY PRODUCING ARTIFICIAL MARBLE AND APPARATUS THEREFOR

BACKGROUND OF THE INVENTION

1. Field of the Invention

The present invention relates to a method and an apparatus for continuously producing an artificial marble plate with a constant thickness.

2. Description of the Related Art

As exemplary apparatuses for producing a hardened polymer plate by continuously polymerizing compounds, Japanese Patent Laid-open No. Hei 10-217264 discloses "a method and an apparatus for continuously producing an artificial marble palate made of acrylate resin", and Japanese Patent Laid-open No. 2000-317957 discloses "a method and an apparatus for producing an artificial marble plate".

FIG. 1 is a cross-sectional view of the continuous hardening apparatus disclosed by Japanese Patent Laid-open No. Hei 10-217264. The continuous hardening apparatus comprises a pair of endless steel belts 101, an idle pulley 102 serving as miscellaneous equipment thereof, a driving pulley 102', upper and lower film feed units 103 and 104, a raw material compound feed unit 105, a thickness adjusting unit 106, hardening chambers 107, 108, 109 and 110, nozzle units 111 and 111', a driving motor 112, and belt back-up rolls 113 and 113'. This apparatus is characterized in that a polymerized raw material compound for an artificial marble plate is continuously entered into the apparatus and then continuously hardened by means of the movement of the belts 101, thus producing a platy artificial marble semi-product, and the produced semi-product is produced as a final artificial marble plate by an edge-trimming step and a surface-polishing step. Here, each of the hardening chambers 107, 108, 109 and 110 is divided into two or more areas, and each of the divided areas includes an air-circulating unit having a blower, a heater, a circulating duct and a nozzle unit. The two divided areas of each of the hardening chambers 107, 108, 109 and 110 are symmetrically installed on the upper and lower surfaces of one pair of the endless steel belts 101 provided with the raw material compound stacked thereon, and provides a hot blast required to produce the final product by hardening the raw material compound, thus heating and cooling the upper and lower surfaces of the polymerized raw material compound.

The hot blast is transmitted into the raw material compound via the air-circulating units symmetrically installed on the upper and lower surfaces of the endless steel belts 101, thereby hardening the raw material compound. In this case, the heat from the hot blast (that is supplied from the air-circulating units disposed on the upper surface of the endless steel belts 101) is transmitted to the upper surface of the raw material compound by convection, while the heat from the hot blast (that is supplied from the air-circulating units disposed on the lower surface of the endless steel belts 101) is transmitted to the lower surface of the raw material compound by conduction since the hot blast is first transmitted to the endless steel belt and then to the raw material compound.

That is, since the technique disclosed by Japanese Patent Laid-open No. Hei 10-217264 applies different heat transmission manners to the upper and lower surfaces of the raw material compound, it is difficult to supply heat in the same amount to the upper and lower surfaces of the raw material compound, thus causing a warpage (stress torsion) on the artificial marble plate obtained by hardening the raw material compound.

FIG. 2 is a cross-sectional view of the apparatus for producing an artificial marble plate disclosed by Japanese Patent Laid-open No. 2000-317957. This apparatus comprises endless belts 201 and 201', rotary drums 202, 202', 203 and 203', rollers 204 and 204', a metering pump 205 for feeding a raw material 205, a raw material injection unit 206, gaskets 207 and 207', hot water spray units 208 and 208', second heating zones 209 and 209', cooling zones 210 and 211, a belt driving motor 212, a first heating zone 213, heating units 214 and 214', and a produced artificial marble plate 215. The apparatus of this patent uses two pairs of the endless belts 201 and 201', and employs a hardening method in which a polymerized raw material for an artificial marble plate is hardened by spraying hot water to each of the endless belts 201 and 201'. Since the heat transmission to the upper and lower surfaces of the polymerized raw material compound is performed by the same manner, this hardening method prevents the warpage of the artificial marble plate obtained by hardening the raw material compound. However, the above hardening method requires a plurality of heating zones and cooling zones, thus complicating the structure of the apparatus itself.

Further, the above-described two apparatuses shown in FIGS. 1 and 2 must be large-sized so as to control the tensions of the one pair or two pairs of the steel belts and operate the steel belts.

SUMMARY OF THE INVENTION

Therefore, the present invention provides an apparatus and a method for continuously producing an artificial marble plate without warpage, in which a raw material compound for the artificial marble plate is continuously fed to a gap between upper and lower horizontal heating plates, and upper and lower surfaces of the raw material compound are hardened at the same temperature by the same heat transmission manner, i.e., conduction. Thus, the hardening is performed on the upper and lower surfaces of the raw material compound at the same rate, thereby increasing the productivity of the apparatus.

In accordance with one aspect of the present invention, an apparatus for continuously producing an artificial marble plate comprises upper and lower carrier films facing each other and receiving a raw material compound for the artificial marble plate into a gap therebetween; upper and lower horizontal heating plates, each including temperature controlling means and heating means for heating upper and lower surfaces of the raw material compound at the same temperature by the same heat transmission manner to harden the raw material compound, while the upper and lower carrier films moving along a gap between the upper and lower horizontal heating plates; and a pair of gaskets disposed at horizontal edges of the upper and lower carrier films for regulating thickness and width of the artificial marble plate obtained by hardening the raw material compound.

The apparatus may further comprise upper and lower carrier film feed unwinders for feeding the upper and lower carrier films to the gap between the upper and the lower horizontal heating plates; a raw material feed tank for feeding the raw material compound for the artificial marble plate into the gap between the upper and lower carrier films; a raw material overflow prevention block, disposed between the raw material feed tank and the lower horizontal heating plate, for preventing the raw material compound fed from the raw material feed tank from flowing over the gaskets; a contact roll, disposed after the raw material overflow prevention block and before the upper horizontal heating plate, for bringing the upper carrier film into contact with the raw material compound; a gasket-protecting film surrounding the gaskets to protect the gaskets; gasket fixing members and a gasket fixing frame, disposed over the gaskets, for fixing the gaskets; vertically movable cylinders, disposed on the upper horizontal heating plate, for controlling the height of the upper horizontal heating plate; upper and lower carrier film recovery winders, communicated with end parts of the upper and lower horizontal heating plates, for collecting the upper and lower carrier films from the artificial marble plate; and a cutting unit, communicated with the upper and lower carrier film recovery winders, for cutting the artificial marble plate released from the upper and lower carrier films.

The apparatus may further comprise a carrier film fixture, disposed under the upper carrier film and on the lower carrier film, for fixing the upper and lower carrier films, for fixing the upper and lower carrier films. The carrier film fixture may include a clamping pin; a chain belt for fixing the clamping pin; a position adjusting gear for adjusting the position of the chain belt; and a driving gear for driving the chain belt.

The heating means may be one unit selected from the group consisting of a hot water heater, a steam heater, and an electric heater unit. Further, preferably, the heating means may heat the raw material compound at a temperature in the range of 30 to 100° C. In case that the heating temperature is excessively low, the time taken to harden the raw material compound is increased and the productivity of the artificial marble plate is lowered. In case that the heating temperature is excessively high, the raw material compound is undesirably suddenly hardened.

The outer diameter or the height of each of the gaskets may be preferably 6 to 40 mm, and more preferably 6 to 20 mm according to the thickness of the artificial marble plate to be produced. Each of the gaskets may be made of one material selected from the group consisting of polymer such as Teflon, nylon and rubber, and metal such as stainless steel, aluminum and copper. Further, each of the gaskets may be made of a circle-shaped or square-shaped tube or pipe. Furthermore, one pair of the gaskets may be spaced from each other by a distance of 500 to 1,300 mm. For instance, in case that the width of the artificial marble plate to be produced is in the range of 760 to 1,220 mm, the distance between the gaskets may be in the range of 800 to 1,300 mm.

Each of the upper and lower carrier films may be made of one or more materials selected from the group consisting of polyethylene, polyester, polypropylene and polyvinyl alcohol. Preferably, each of the upper and lower carrier films may have a thickness of 20 to 100 µm. In case that the upper and lower carrier films are excessively thin, the films are easily torn or cannot transfer the raw material compound thereon. In case that the upper and lower carrier films are excessively thick, since the films are undesirably wrinkled, it is difficult to maintain the smoothness of the upper surfaces of the films in the hardening of the raw material compound.

The vertically movable cylinders for controlling the height of the upper horizontal heating plate may be vertically moved by a distance of 0 to 1,000 mm. For instance, the movement distance of the vertically movable cylinders may be controlled in the range of 6 to 20 mm according to the thickness of the artificial marble plate to be produced during the producing process, and in the range of 300 to 1,000 mm when the apparatus is cleaned up after a production run or during repair work.

In accordance with another aspect of the present invention, there is provided a method for continuously producing an artificial marble plate. The method comprises: feeding a raw material compound for the artificial marble plate to a space defined by upper and lower carrier films facing each other and a pair of gaskets disposed at horizontal edges of the upper and lower carrier films; and heating upper and lower surfaces of the raw material compound at the same temperature by the same heat transmission manner to harden the upper and lower surfaces of the raw material compound at the same rate, via a pair of upper and lower horizontal heating plates, while moving the upper and lower carrier films along a gap between the upper and lower horizontal heating plates.

The raw material compound includes one or more thermosetting resins selected from the group consisting of unsaturated polyester resin, acrylate resin and methacrylate resin, one or more fillers selected from the group consisting of aluminum hydroxide, calcium carbonate, silicate and magnesium oxide, one or more reaction initiators selected from the group consisting of peroxide compound and perester compound, and acrylate compound as a crosslinking agent.

The raw material compound for the artificial marble plate may have a viscosity of 10 to 300 poise. In case that the viscosity of the raw material compound is excessively low, severe phase separation of the raw material compound occurs, thus deforming the artificial marble plate. In case that the viscosity of the raw material compound is excessively high, it is difficult to smoothly feed the raw material compound or easily remove air from the fed raw material compound. In exemplary embodiments of the invention, the raw material compound for the artificial marble plate may have a viscosity of 50 to 150 poise.

The upper horizontal heating plate may be located 0.5 to 1.0 mm above the gaskets, in consideration of the difficulty in moving the upper carrier film due to the friction on the interfaces between the upper horizontal heating plate and the thickness regulating gaskets.

In accordance with the apparatus and method for continuously producing an artificial marble plate of the present invention, the upper and lower horizontal heating plates with a temperature controlled in the range of 30 to 100° C. are symmetrically disposed on the upper and lower surfaces of the raw material compound, a gap between the upper and lower horizontal heating plates is controlled in the range of 0 to 1,000 mm, and the lower surface of the raw material compound contacts the upper surface of the lower horizontal heating plate and the upper surface of the raw material compound contacts the lower surface of the upper horizontal heating plate. Accordingly, since heat is transmitted to the upper and lower surfaces of the raw material compound by the same manner, it is possible to produce an artificial marble plate without warpage.

In accordance with the method for continuously producing an artificial marble plate of the present invention, the upper and lower horizontal heating plates, which have a temperature controlled in the range of 30 to 100° C. horizontally and face each other, are disposed to have a gap between the upper and lower horizontal heating plates in the range of 0 to 1,000 mm, and a lower carrier film with a thickness of 20 to 100 µm, made of one or more materials selected from the group consisting of polyethylene, polyester, polypropylene and polyvinyl alcohol, is disposed on the upper surface of the lower horizontal heating plate so that the lower carrier film is continuously moved between the upper and lower horizontal heating plates. The raw material compound to be polymerized is disposed on the lower carrier film, and then an upper carrier film with a thickness of 20 to 100 µm, made of one or more materials selected from the group consisting of polyethylene, polyester, polypropylene and polyvinyl alcohol, is disposed on the upper surface of the raw material compound. The upper carrier film contacts the lower surface of the upper horizontal heating plate so that the upper carrier film is continuously moved between the upper and lower horizontal heating plates. Accordingly, the artificial marble plate is obtained by hardening the raw material compound.

It is advantageous to use the upper and lower carrier films contacting the upper and lower surfaces of the raw material compound made of the same material with the same thickness.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF PREFERRED EMBODIMENTS

Now, preferred embodiments of the present invention will be described in detail with reference to the annexed drawings.

Figure 1:
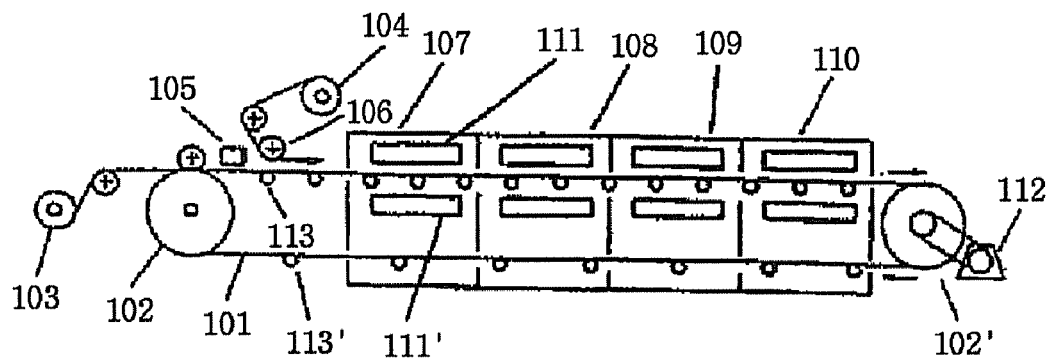
FIG. 1 is a cross-sectional view of an apparatus disclosed by Japanese Patent Laid-open No. Hei 10-217264.
Figure 2:
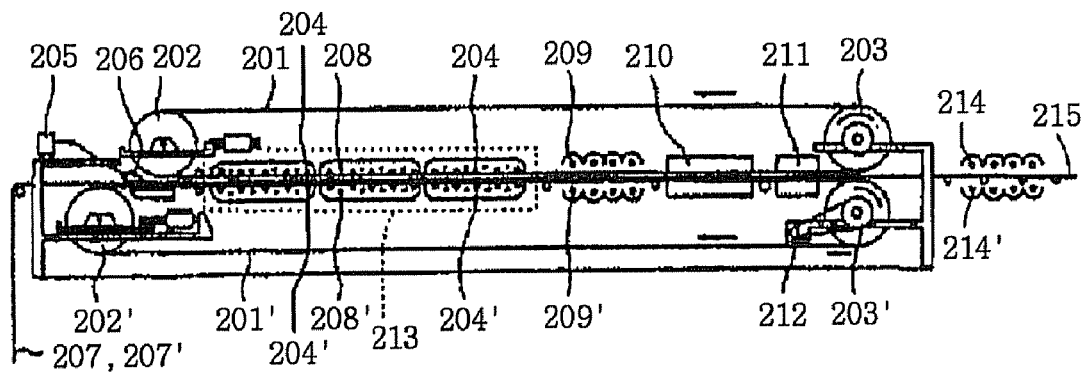
FIG. 2 is a cross-sectional view of an apparatus disclosed by Japanese Patent Laid-open No. 2000-317957.

FIG. 1 is a cross-sectional view of a conventional apparatus for continuously producing an artificial marble plate, which is provided with a pair of endless steel belts, disclosed by Japanese Patent Laid-open No. Hei 10-217264. FIG. 2 is a cross-sectional view of a conventional apparatus for continuously producing an artificial marble plate, which is provided with two pairs of endless belts, disclosed by Japanese Patent Laid-open No. 2000-317957. As described above, the conventional apparatus of FIG. 1 applies different heat transmission manners to the upper and lower surfaces of a raw material compound, thus causing a warpage on the produced artificial marble plate. Further, the conventional apparatus of FIG. 2 has a complicated structure.

Figure 3:
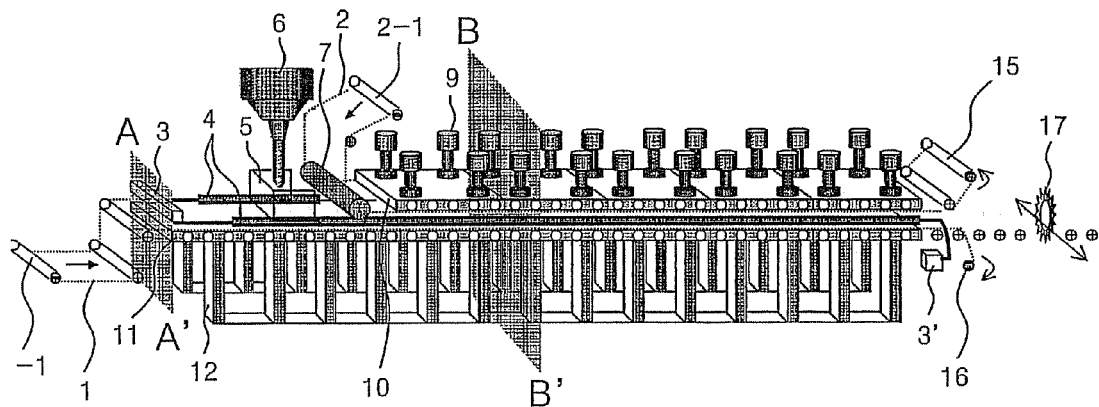
FIG. 3 is a perspective view of an apparatus for continuously producing an artificial marble plate in accordance with an exemplary embodiment of the present invention.

FIG. 3 is a perspective view of an apparatus for continuously producing an artificial marble plate in accordance with an exemplary embodiment of the present invention. A lower carrier film 1 has a thickness of approximately 20 to 100 µm, and may be made of polyethylene, polyester, polypropylene, polyvinyl alcohol, etc.

An upper carrier film 2 has the same thickness as that of the lower carrier film 1, and is made of the same material as that of the lower carrier film 1. Preferably, the upper and lower carrier films 1 and 2 are made of the same material with the same thickness. More preferably, the upper and lower carrier films 1 and 2 are made of polyvinyl alcohol with a thickness of 35 to 70 µm.

The upper and lower carrier films 1 and 2 are fed to a gap between upper and lower horizontal heating plates 10 and 11 by upper and lower carrier film feed unwinders 1-1 and 2-1.

A pair of right and left thickness regulating gaskets 4 is provided at horizontal edges of the upper and lower carrier films 1 and 2 to regulate the thickness and width of an artificial marble plate to be produced. The thickness regulating gaskets 4 are made of a polymeric tube with an outer diameter of 6 mm to 40 mm such as a Teflon tube or nylon tube, a metal pipe with an outer diameter of 6 mm to 40 mm such as a stainless steel pipe, an aluminum pipe or a copper pipe, or a square-shaped material with a height of 6 mm to 40 mm such as Teflon, nylon, rubber, stainless steel, aluminum, copper, etc. Preferably, the thickness regulating gaskets 4 are made of a Teflon tube or a nylon tube with an outer diameter of 6 mm to 30 mm. Each of the right and left thickness regulating gaskets 4 is respectively fixed to thickness regulating gasket fixing frames 3 and 3' disposed over the thickness regulating gaskets 4.

A raw material feed tank 6 serves to feed a raw material for producing the artificial marble plate. A raw material overflow prevention block 5 is disposed between the raw material feed tank 6 and the lower horizontal heating plate 11 to prevent the raw material compound from flowing over the thickness regulating gaskets 4. Preferably, the raw material overflow prevention block 5 is made of a material with high tolerance to methyl methacrylate monomer and styrene monomer. The raw material overflow prevention block 5, for instance, includes stainless steel or Teflon, however, the raw material overflow prevention block 5 may be made other materials if a layer with a high tolerance to solvents is formed on the surface of the raw material overflow prevention block 5 contacting the raw material compound.

An upper carrier film contact roll 7, which is disposed after the material overflow prevention block and before the upper horizontal heating plate, brings the upper carrier film 2 into contact with the upper surface of the raw material compound so that the raw material compound is protected from foreign substances such as air and dust. The upper carrier film contact roll 7 serves to control the thickness of the artificial marble plate to be produced.

Vertically movable cylinders 9 are disposed on the upper horizontal heating plate 10 to control the height of the upper horizontal heating plate 10, and move upward and downward so as to sufficiently elevate the upper horizontal heating plate 10 for repairing or cleaning.

The upper horizontal heating plate 10 functions to supply heat to the raw material compound and control the thickness of the fed raw material compound, and includes a steam or hot water feed unit or an electric heater unit as heating means. Here, the heating temperature of the heating means of the upper horizontal heating plate 10 can be controlled in the range of approximately 30 to 100° C.

The lower horizontal heating plate 11 serves to support the lower carrier film 1, prevents the raw material compound from sagging during production, and supplies heat to the raw material compound so that the raw material compound is continuously hardened. Similarly to the upper horizontal heating plate 10, the lower horizontal heating plate 11 includes a steam or hot water feed unit or an electric heater unit as heating means. Further, the heating temperature of the heating means of the lower horizontal heating plate 11 can be controlled in the range of approximately 30 to 100° C. Particularly, it is important to heat the upper and lower surfaces of the raw material compound at the same temperature using the upper and lower heating plates 10 and 11.

A lower horizontal heating plate supporting frame 12 is provided to support the lower horizontal heating plate 11. Upper and lower carrier film recovery winders 15 and 16 are disposed the end areas of the upper and lower horizontal heating plates 10 and 11 to collect the upper and lower carrier films 1 and 2 from the upper and lower surfaces of the artificial marble plate obtained by hardening the compound by means of the upper and lower horizontal heating plates 10 and 11.

A cutting unit 17 is a circular saw communicated to the upper and lower horizontal heating plates 10 and 11, and serves to continuously cut the artificial marble plate into plural units with a regulated size.

Figure 4:
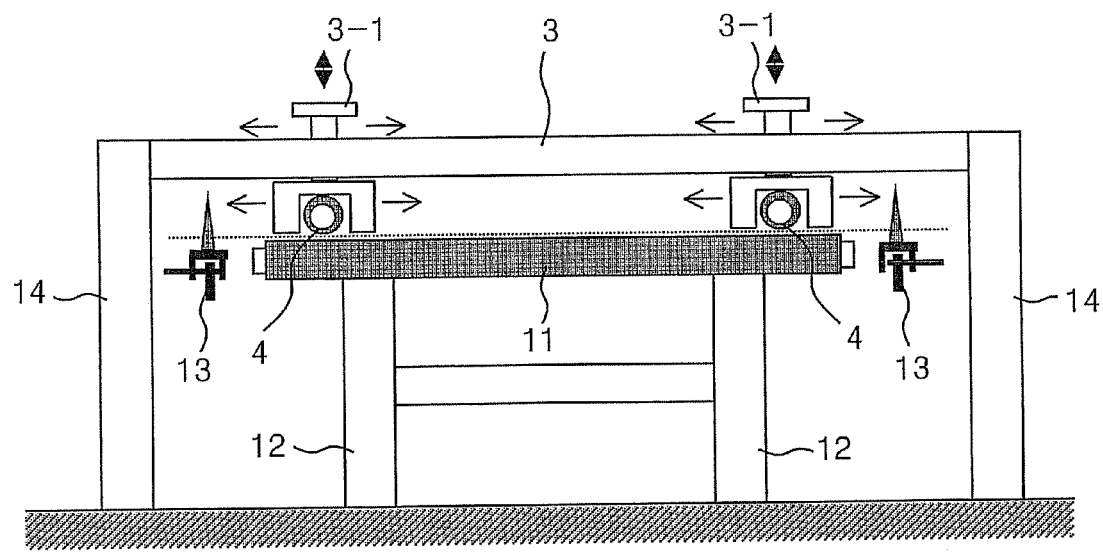
FIG. 4 is a cross-sectional view taken along the line A-A' of FIG. 3.

FIG. 4 is a cross-sectional view taken along the line A-A' of a starting area of the lower horizontal heating plate 11 of FIG. 3. Thickness regulating gasket fixing members 3-1 are disposed on the thickness regulating gasket fixing frames 3 and 3', and holds and fixes the thickness regulating gaskets 4 for regulating the thickness and width of a final product to the thickness regulating gasket fixing frames 3 and 3'. A supporting frame 14 is provided to support the upper horizontal heating plate 10 and the vertically movable cylinders 9.

Figure 5:
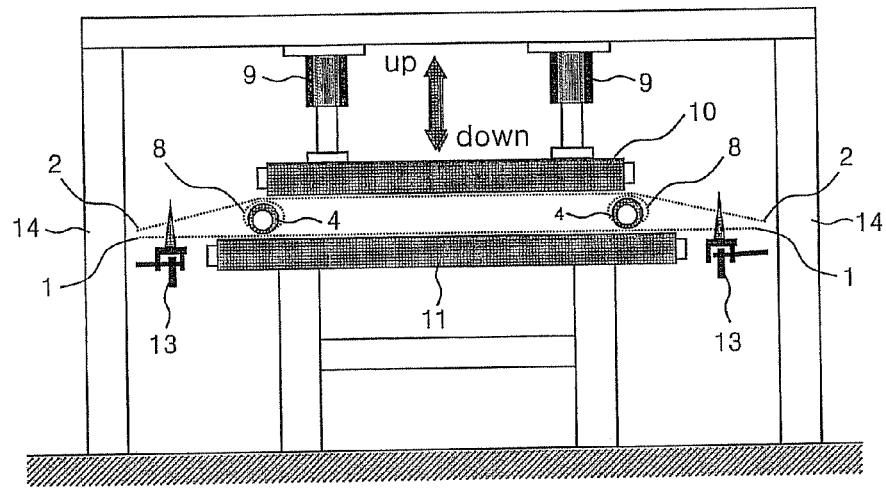
FIG. 5 is a cross-sectional view taken along the line B-B' of FIG. 3.

FIG. 5 is a cross-sectional view taken along the line B-B' of FIG. 3. A thickness regulating gasket-protecting film 8 surrounds the thickness regulating gaskets 4 to prevent the raw material compound from contacting the thickness regulating gaskets 4, thus protecting the raw material compound from damage. The thickness regulating gasket-protecting film 8 has a thickness of 10 to 100 μm, and is made of polyethylene, polyester, polypropylene, or polyvinyl alcohol.

Figure 6:
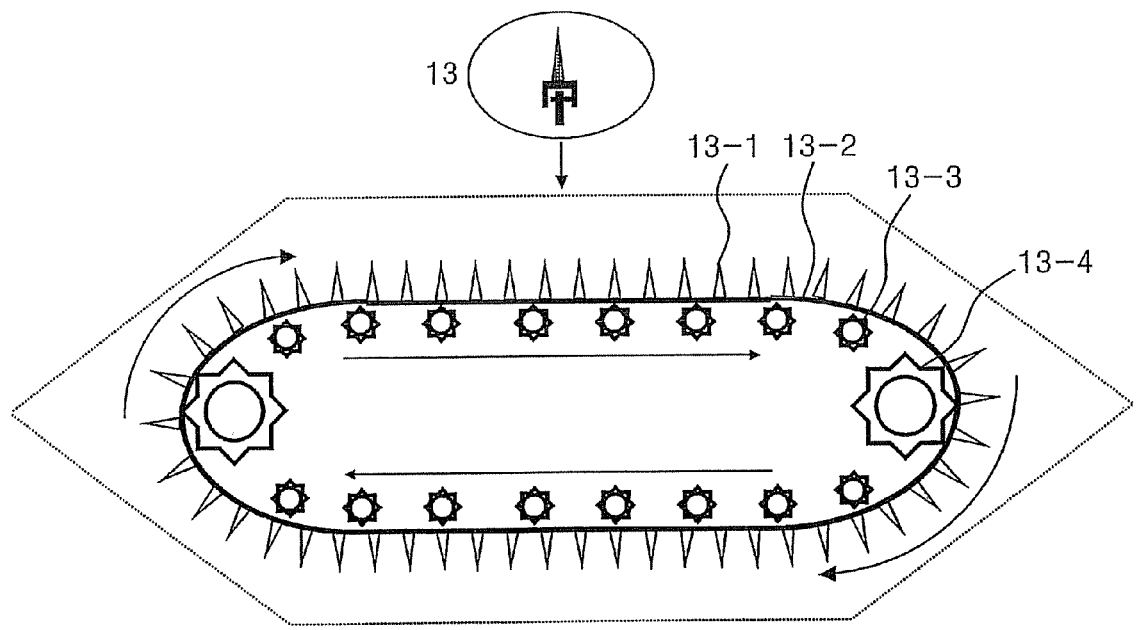
FIG. 6 is a schematic view of a carrier film fixture in FIGS. 4 and 5.

FIG. 6 is a schematic view of a carrier film fixture 13 in FIGS. 4 and 5. The carrier film fixture 13 is disposed under the upper carrier film 2 and on the lower carrier film 1 to fix the upper and lower carrier films 2 and 1. The carrier film fixture 13 comprises a clamping pin 13-1, a pin fixing chain belt 13-2 for fixing the clamping pin 13-1, a chain belt position adjusting gear 13-3 for adjusting the position of the pin fixing chain belt 13-2, and a chain belt driving gear 13-4 for driving the pin fixing chain belt 13-2 so that the upper and lower carrier films 1 and 2 are continuously transferred by the chain belt driving gear 13-4.

Figure 7:
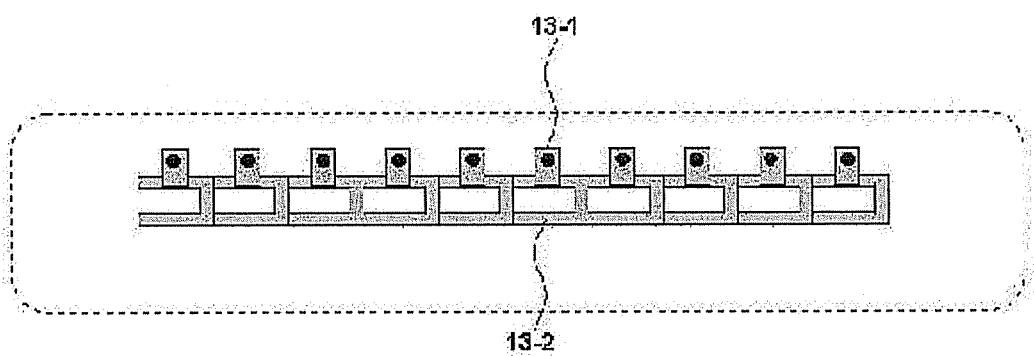
FIG. 7 is a schematic plan view of a pin fixing chain belt of FIG. 6.
Figure 8:
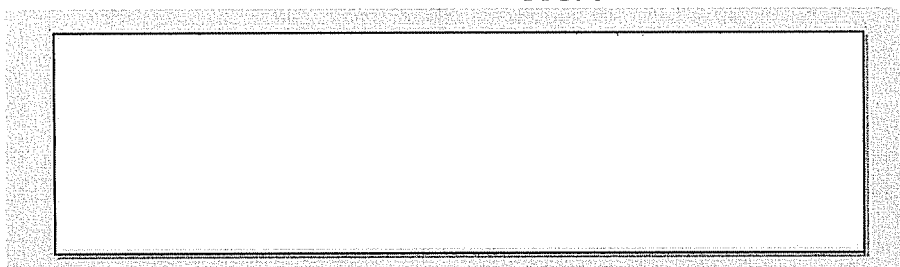
FIG. 8 is a diagram illustrating a final product produced by the apparatus of FIG. 3.
Figure 8:
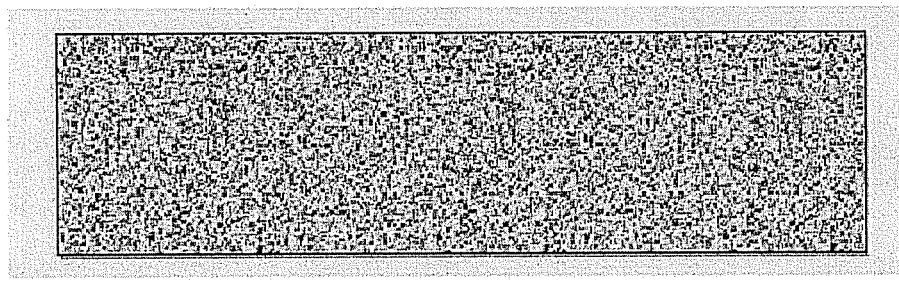

FIG. 7 is a plan view of the pin fixing chain belt 13-2 of FIG. 6, and shows the positions of the upper and lower carrier films 1 and 2 on the upper and lower surfaces of the pin fixing chain belt 13-2. FIG. 8 shows an artificial marble plate produced by the apparatus of the present invention.

Hereinafter, with reference to FIG. 3, a method for continuously producing an artificial marble plate in accordance with the present invention will be described in detail.

First, there is prepared a raw material compound by mixing a thermosetting resin such as unsaturated ester resin, acrylate resin or methacrylate resin, a filler such as aluminum hydroxide, silicate or magnesium oxide, a reaction initiator such as peroxide compound or perester compound, and a crosslinking agent such as acrylate compound. The raw material compound has a viscosity of 10 to 300 poise, preferably 30 to 200 poise, and more preferably 50 to 150 poise. Here, the viscosity of the raw material compound is adjusted by controlling the ratio of the thermosetting resin and the filler, and controlling the contents of monomers and polymers contained in the thermosetting resin.

The thickness regulating gaskets 4 are set on the thickness regulating gasket fixing members 3-1, and fixed to the thickness regulating gasket fixing frames 3 and 3'. The distance between the two thickness regulating gaskets 4 may be adjusted in the range of 500 mm to 1,300 mm. The thickness regulating gaskets 4 are made of a polymeric tube with an outer diameter of 6 mm to 40 mm such as a Teflon tube or nylon tube, a metal pipe with an outer diameter of 6 mm to 40 mm such as a stainless steel pipe, an aluminum pipe or a copper pipe, or a square-shaped material with a height of 6 mm to 40 mm such as Teflon, nylon, rubber, stainless steel, aluminum, copper, etc. Preferably, the thickness regulating gaskets 4 are made of a Teflon tube or a nylon tube with an outer diameter of 6 mm to 30 mm.

Subsequently, the lower carrier film 1 is disposed on the upper surface of the lower horizontal heating plate 11, and both edges of the lower carrier film 1 are inserted into the carrier film fixture 13. Then, the lower carrier film 1 is continuously moved by driving the chain belt driving gear 13-4. The lower carrier film 1 is disposed on the lower surfaces of the thickness regulating gaskets 4. The lower carrier film 1 has a thickness of approximately 20 to 100 μm, and is made of polyethylene, polyester, polypropylene, polyvinyl alcohol, or etc.

The thickness regulating gasket-protecting film 8 surrounds the outer diameters of the thickness regulating gaskets 4, and moves together with the lower carrier film 1. Here, the thickness regulating gasket-protecting film 8 serves to protect the thickness regulating gaskets 4 and promote the smooth transfer of the raw material compound, and is made of polyethylene, polyester, polypropylene, or polyvinyl alcohol. The proper thickness of the thickness regulating gasket-protecting film 8 is approximately 10 to 100 μm.

Subsequently, the upper carrier film 2 is disposed on the lower surface of the upper horizontal heating plate 10, i.e., on the upper surfaces of the thickness regulating gaskets 4, via the upper carrier film contact roll 7, and fixed to the carrier film fixture 13. Then, the upper carrier film 2 moves at the same rate as the lower carrier film 1. Here, the upper carrier film 2 has a thickness of approximately 20 to 100 μm, and is made of polyethylene, polyester, polypropylene, polyvinyl alcohol, or etc.

The raw material overflow prevention block 5 is installed on the apparatus of the present invention, thus preventing the raw material compound from flowing over the thickness regulating gaskets 4. The raw material overflow prevention block 5 is made of a material with high tolerance to methyl methacrylate monomer and styrene monomer, and preferably made of stainless steel or Teflon.

The upper horizontal heating plate 10 is moved downward using the vertically movable cylinders 9 so that the upper horizontal heating plate 10 is located approximately 0.5 to 1.0 mm above the thickness regulating gaskets 4. In case that the upper horizontal heating plate 10 directly contacts the upper surfaces of the thickness regulating gaskets 4, friction is produced on the interfaces between the upper horizontal heating plate 10 and the thickness regulating gaskets 4, thus causing a difficulty in moving the upper carrier film 2.

The height of the upper carrier film contact roll 7 is adjusted depending on a desired thickness of the artificial marble plate to be produced. Here, the contact roll 7 is not forcibly operated so that the contact roll 7 is rotated only by the movement of the upper carrier film 2.

The temperatures of the upper and lower horizontal heating plates 10 and 11 are controlled according to the kinds of the used reaction initiator so that the raw material compound can be heated in the range of approximately 30 to 100° C. The upper and lower horizontal heating plates 10 and 11 are provided with a hot water heater, a steam heater or an electric heater unit as a proper heating source system. In an exemplary embodiment of the present invention, the upper and lower horizontal heating plates 10 and 11 are designed such that the temperatures thereof are kept in the range of 75±5° C. using the hot water heater.

After the above conditions of the apparatus are set, the chain belt driving gear 13-4 is driven, and both edges of the lower and upper carrier films 1 and 2 are inserted into the carrier film fixture 13. Then, the lower and upper carrier films 1 and 2 are continuously moved. The raw material compound from the raw material feed tank 6 is fed to a gap between the lower carrier film 1 and the upper carrier film 2 via the raw material overflow prevention block 5, and continuously hardened by the lower and upper horizontal heating plates 11 and 10, thus being produced as an artificial marble plate.

Here, since the raw material compound is disposed on the gap between the lower carrier film 1 and the upper carrier film 2, air must be prevented from entering a space between the upper surface of the raw material compound and the upper carrier film 2.

Hereinafter, with reference to test examples and comparative examples, the continuous producing of the artificial marble plate shown in FIG. 8 using the apparatus shown in FIG. 3 will be described in detail. The scope and spirit of the present invention are not limited by the below examples.

TEST EXAMPLE 1

Methyl methacrylate (MMA) monomer in an amount of approximately 75% by weight and polymethyl methacrylate (PMMA) polymer with a weight average molecular weight of not more than 10 in an amount of approximately 25% were mixed and dissolved to produce syrup with a designated viscosity. Here, the viscosity of the produced syrup was 700 cP. The measurement of the viscosity of the syrup was carried out using 4 rotors in a Broock Field Viscometer in 30 rpm at 23° C. for 3 minutes.

Ethylene glycol dimethacrylate ("SR206" is a trademark manufactured by Sartomer Company, Inc., in U.S.) in amount of approximately 3% by weight as a crosslinking agent, sodium hydroxide with an average particle size of 25 μm in an amount of approximately 180% by weight, and benzoic peroxide in an amount of approximately 1% by weight as a reaction initiator were mixed with the above syrup in an amount of approximately 100% by weight within an agitator in which vacuum degassing can be performed, and then the mixture was degassed under the vacuum condition with a vacuum degree of less than 700 mmHg for 10 minutes. As a result, a raw material compound with a viscosity of 8,000 centipoise was produced. Then, the produced raw material compound was transferred into the raw material feed tank 6.

The thickness regulating gaskets 4 were set on the thickness regulating gasket fixing members 3-1, and fixed to the thickness regulating gasket fixing frames 3 and 3'. Here, the distance between the two thickness regulating gaskets 4 was 600 mm, and the thickness regulating gaskets 4 was made of a Teflon tube with an outer diameter of 13.0 mm.

Subsequently, the lower carrier film 1 was disposed on the upper surface of the lower horizontal heating plate 11, and both edges of the lower carrier film 1 were inserted into the carrier film fixture 13. Then, the lower carrier film 1 was continuously moved by driving the chain belt driving gear 13-4. Here, the chain belt driving gear 13-4 was driven so that the linear velocity of the lower carrier film 1 was approximately 0.2 m per minute. The lower carrier film 1 was disposed on the lower surfaces of the thickness regulating gaskets 4.

In order to protect the thickness regulating gaskets 4 and promote the smooth transfer of the raw material compound, the thickness regulating gasket-protecting film 8 surrounded the outer diameters of the thickness regulating gaskets 4, and was moved together with the lower carrier film 1.

The upper carrier film 2 was disposed on the lower surface of the upper horizontal heating plate 10, i.e., on the upper surfaces of the thickness regulating gaskets 4, via the upper carrier film contact roll 7, and then inserted into the carrier film fixture 13 so that the upper carrier film 2 was moved at the same rate as that of the lower carrier film 1.

The raw material overflow prevention block 5 was provided on the apparatus. The upper horizontal heating plate 10 was moved downward using the vertically movable cylinders 9, so that the upper horizontal heating plate 10 was located approximately 0.5 to 1.0 mm above the thickness regulating gaskets 4.

The above-prepared raw material compound from the raw material feed tank 6 was fed into a gap between the lower carrier film 1 and the upper carrier film 2 via the raw material overflow prevention block 5, so that the lower carrier film 1, the raw material compound and the upper carrier film 2 were continuously moved. Here, hot water was supplied to the upper and lower horizontal heating plates 10 and 11 so that the temperatures of the upper and lower horizontal heating plates 10 and 11 were both 70° C.

The raw material compound was hardened by the above conditions, thereby being produced into an artificial marble plate with a thickness of 13.0 to 14.0 mm. Here, the time required to harden the raw material compound was 30 minutes and the maximum reactive temperature was approximately 120 to 130° C. Properties of the obtained artificial marble plate are shown in Table 1 below.

TEST EXAMPLE 2

The temperatures of the upper and lower horizontal heating plates 10 and 11 were set to both 80° C. Other conditions were the same as those of the test example 1.

Here, the required time was 23 minutes and the maximum reactive temperature was approximately 130 to 140° C. Properties of an obtained artificial marble plate are shown in Table 1 below.

TEST EXAMPLE 3

The temperatures of the upper and lower horizontal heating plates 10 and 11 were set to both 90° C. Other conditions were the same as those of the test example 1.

Here, the required time was 19 minutes and the maximum reactive temperature was approximately 138 to 150° C. Properties of an obtained artificial marble plate are shown in Table 1 below.

COMPARATIVE EXAMPLE 1

The temperature of the upper horizontal heating plate 10 was set to 70° C., and the temperature of the lower horizontal heating plate 11 was set to 80° C. Other conditions were the same as those of the test example 1.

Here, the required time was 25 minutes and the maximum reactive temperature was approximately 130 to 135° C. Properties of the obtained artificial marble plate are shown in Table 1 below.

COMPARATIVE EXAMPLE 2

The temperature of the upper horizontal heating plate 10 was set to 80° C., and the temperature of the lower horizontal heating plate 11 was set to 70° C. Other conditions were the same as those of the test example 1.

Here, the required time was 25 minutes and the maximum reactive temperature was approximately 130 to 135° C. Properties of the obtained artificial marble plate are shown in Table 1 below.

COMPARATIVE EXAMPLE 3

Properties of a commercially distributed acrylate artificial marble plate were measured.

[Measurement of Properties]

Each of the obtained artificial marble plates by the test examples 1 to 3 and the comparative examples 1 to 3 was precisely cut into a section with a size of 550 mm×550 mm, and mounted on a bottom board. Then, a bending degree of the cut section mounted on the bottom board was measured in transversal and longitudinal directions using a clearance gauge. Here, a mark (+) denotes that the central portion of the cut section is convex relative to the edge portion of the cut section, and a mark (−) denotes that the central portion of the cut section is concave relative to the edge portion of the cut section.

Bending strengths of the plates were measured in accordance with ASTM D 790.

TABLE 1

| | Reactive temp. (° C.) | | Bending degree (mm) | | | | |
| | | | Transversal direction | | Longitudinal direction | | Bending |
| Division | Upper horizontal heating plate | Lower horizontal heating plate | Initial stage | After 7 days | Initial stage | After 7 days | strength (kgf/mm) |
|---|---|---|---|---|---|---|---|
| Test example 1 | 70 | 70 | ±0.2 | ±0.3 | ±0.1 | ±0.2 | 6.5 |
| Test example 2 | 80 | 80 | ±0.2 | ±0.3 | ±0.2 | ±0.3 | 6.5 |
| Test example 3 | 90 | 90 | ±0.4 | ±0.5 | ±0.3 | ±0.4 | 6.4 |
| Comparative example 1 | 70 | 80 | +3.0 | +5.0 | +2.0 | +3.0 | 6.5 |
| Comparative example 2 | 70 | 80 | −2.0 | −4.0 | −2.0 | −2.5 | 6.4 |
| Comparative example 3 | Commercial product (n = 10) | | ±1.5 | | ±1.0 | | 6.2 |

As comparatively analyzing the above resulted values in Table 1, the transversal and longitudinal bending degrees of the artificial marble plates according to exemplary embodiments of the invention (in which the same heat transmission manner was applied to the upper and lower surfaces of the raw material compound so that the upper and lower surfaces of the raw material compound were set to the same temperature), were smaller than those of conventional artificial marble plates (which were obtained by applying the different transmission manners to the upper and lower surfaces of the raw material compound so that the upper and lower surfaces of the raw material compound were set to different temperatures). Further, the transversal and longitudinal bending degrees of the artificial marble plates according to exemplary embodiments of the invention were smaller than those of the conventional artificial marble plates.

As a result, it is noted that the bending degree of a product obtained by hardening a raw material compound can be minimized by applying the same heat transmission manner at the same temperature to upper and lower surfaces of the raw material compound.

While the conventional apparatuses shown in FIGS. 1 and 2 are large-sized so as to control the tensions of the one pair or two pairs of the steel belts and operate the steel belts, the apparatus of the present invention is advantageous in that the configuration and appearance thereof are relatively simple.

According to exemplary embodiments of the present invention, an apparatus and a method for producing an artificial marble plate apply the same heat transmission manner to upper and lower surfaces of a raw material compound to be polymerized so that the hardening is simultaneously and uniformly performed on the upper and lower surfaces of the raw material compound, thus preventing the warpage of the obtained artificial marble plate. Further, since heat is directly transmitted to the raw material compound using upper and lower horizontal heating plates, the apparatus of the present invention has improved productivity and heat transmission efficiency.

Compared with the conventional continuous hardening apparatus comprising a pair of endless steel belts and other additional components, the apparatus of the present invention has a simple constitution, and minimizes the bending degree of the obtained artificial marble plate. Further, compared with the conventional continuous hardening apparatus comprising two pairs of endless steel belts and other additional components, the apparatus of the present invention has a simple constitution, and minimizes the bending degree of the obtained artificial marble plate.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for continuously producing an artificial marble plate comprising:
    feeding a raw material compound for the artificial marble plate to a space defined by upper and lower carrier films facing each other and a pair of gaskets disposed at horizontal edges of the upper and lower carrier films; and
    heating upper and lower surfaces of the raw material compound at the same temperature by the same heat transmission manner to harden the upper and lower surfaces of the raw material compound at the same rate, via a pair of upper and lower horizontal heating plates symmetrically disposed on the upper and lower surfaces of the raw material compound, supported by a frame and receiving the upper and lower carrier films into a gap therebetween, each including temperature controlling means and heating means for heating upper and lower surfaces of the raw material compound, wherein the upper heating plates are in contact with the upper carrier film and the lower heating plates are in contact with the lower carrier film, while moving the upper and lower carrier films along a gap between the upper and lower horizontal heating plates, wherein heating is done without pressing or pressure.

2. The method for continuously producing an artificial marble plate as set forth in claim 1, wherein heating upper and lower surfaces of the raw material compound includes heating the upper and lower surfaces of the raw material at the same temperature in the range of 30 to 100° C.

3. The method for continuously producing an artificial marble plate as set forth in claim 1, wherein the raw material compound includes one or more thermosetting resins selected from the group consisting of unsaturated polyester resin, acrylate resin and methacrylate resin, one or more fillers selected from the group consisting of aluminum hydroxide, calcium carbonate, silicate and magnesium oxide, one or more reaction initiators selected from the group consisting of peroxide compound and perester compound, and acrylate compound as a crosslinking agent.

4. The method for continuously producing an artificial marble plate as set forth in claim 1, wherein the raw material compound for the artificial marble plate has a viscosity of 10 to 300 poise.

5. The method for continuously producing an artificial marble plate as set forth in claim 1, wherein the upper horizontal heating plate is located 0.5 to 1.0 mm above the gaskets.

* * * * *